United States Patent
Wang et al.

(10) Patent No.: US 11,581,993 B2
(45) Date of Patent: Feb. 14, 2023

(54) RECEPTION TIMING CONFIGURATION METHOD AND COMMUNICATIONS DEVICE

(71) Applicant: HUAWEI TECHNOLOGIES CO., LTD., Guangdong (CN)

(72) Inventors: Ting Wang, Shanghai (CN); Yuanjie Li, Shanghai (CN); Na Deng, Shenzhen (CN); Shengyue Dou, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 23 days.

(21) Appl. No.: 16/271,297

(22) Filed: Feb. 8, 2019

(65) Prior Publication Data
US 2019/0173635 A1    Jun. 6, 2019

Related U.S. Application Data

(63) Continuation of application No. PCT/CN2017/081714, filed on Apr. 24, 2017.

(30) Foreign Application Priority Data

Aug. 9, 2016 (CN) .......................... 201610653763.5

(51) Int. Cl.
*H04L 5/00* (2006.01)
*H04B 7/02* (2018.01)
(Continued)

(52) U.S. Cl.
CPC ............ *H04L 5/0035* (2013.01); *H04B 7/02* (2013.01); *H04L 5/0053* (2013.01);
(Continued)

(58) Field of Classification Search
CPC .... H04L 5/0035; H04W 72/04; H04W 72/12; H04B 7/024
See application file for complete search history.

(56) References Cited

U.S. PATENT DOCUMENTS 9,231,666 B2   1/2016  Muharemovic et al.
2010/0172340 A1  7/2010  Muharemovic et al.
(Continued)

FOREIGN PATENT DOCUMENTS

CN  103313376 A  9/2013
CN  104468030 A  3/2015
(Continued)

OTHER PUBLICATIONS

3GPP TS 36.213 V13.2.0 (Jun. 2016);3rd Generation Partnership Project;Technical Specification Group Radio Access Network;Evolved Universal Terrestrial Radio Access (E-UTRA);Physical layer procedures(Release 13),total 381 pages.

*Primary Examiner* — Khaled M Kassim
*Assistant Examiner* — Najeeb Ansari
(74) *Attorney, Agent, or Firm* — Womble Bond Dickinson (US) LLP

(57) ABSTRACT

A reception timing configuration method and a communications device are provided. The method includes: configuring, by a first communications device for a second communications device, a reception timing parameter corresponding to transmission, where the reception timing parameter includes at least two timing points respectively corresponding to at least two transmission points, and the at least two transmission points are configured to transmit downlink data to the terminal device cooperatively; and sending, by the first communications device, indication information to the second communications device, where the indication information is used to indicate the reception timing parameter. According to the method, there may be a plurality of corresponding reception timings when different data is sent by using a same frequency.

10 Claims, 4 Drawing Sheets

(51) Int. Cl.
    *H04W 56/00* (2009.01)
    *H04W 72/04* (2009.01)
    *H04B 7/04* (2017.01)
    *H04W 72/0446* (2023.01)

(52) U.S. Cl.
    CPC ....... *H04W 56/001* (2013.01); *H04W 72/042* (2013.01); *H04W 72/0446* (2013.01); *H04B 7/04* (2013.01); *H04W 56/00* (2013.01); *H04W 72/04* (2013.01)

(56) References Cited

U.S. PATENT DOCUMENTS

| | | |
|---|---|---|
| 2013/0155956 A1 | 6/2013 | Muharemovic et al. |
| 2014/0003324 A1* | 1/2014 | Davydov .......... H04W 52/0206 370/312 |
| 2015/0016419 A1* | 1/2015 | Kim ...................... H04W 36/04 370/331 |
| 2015/0103741 A1* | 4/2015 | Uchino ............. H04W 56/0045 370/328 |
| 2015/0270917 A1* | 9/2015 | Roman .................. H04J 11/005 370/329 |
| 2015/0304063 A1* | 10/2015 | Zhu ...................... H04W 72/048 370/329 |
| 2017/0195028 A1* | 7/2017 | Shimezawa ........... H04W 28/06 |
| 2017/0230087 A1 | 8/2017 | Sun et al. |
| 2017/0347270 A1* | 11/2017 | Iouchi ............... H04W 72/0406 |
| 2019/0013881 A1* | 1/2019 | Olesen ..................... H04B 1/10 |
| 2019/0349937 A1* | 11/2019 | Kusashima ........... H04L 1/1812 |

FOREIGN PATENT DOCUMENTS

| | | |
|---|---|---|
| CN | 105471790 A | 4/2016 |
| WO | 2016/021903 A1 | 2/2016 |

\* cited by examiner

RECEPTION TIMING CONFIGURATION METHOD AND COMMUNICATIONS DEVICE

CROSS-REFERENCE TO RELATED APPLICATIONS

This application is a continuation of International Application No. PCT/CN2017/081714, filed on Apr. 24, 2017, which claims priority to Chinese Patent Application No. 201610653763.5, filed Aug. 9, 2016, the disclosures of the aforementioned applications are hereby incorporated by reference in their entireties.

TECHNICAL FIELD

The present disclosure relates to the field of communications technologies, and in particular, to a reception timing configuration method and a communications device.

BACKGROUND

Coordinated multipoint (CoMP) transmission/reception means that a plurality of geographically separated transmission points cooperatively participate in sending downlink data to a terminal device or jointly receive uplink data sent by a terminal device, for example, send downlink data through a physical downlink shared channel (PDSCH) in a Long Term Evolution (LTE) system, or receive, through a physical uplink shared channel (PUSCH) in the LTE system, uplink data sent by a terminal device.

A multiple input multiple output (MIMO) technology (which may also be referred to as a multiple-antenna technology) can improve system reliability through space diversity, increase a system capacity through spatial multiplexing, and improve cell coverage through beamforming. A basic technology of a physical layer in the LTE system includes the MIMO technology.

A plurality of transmit antennas in a conventional centralized MIMO system are centralized at a base station end. Different from the centralized MIMO system, a plurality of transmit antennas of a distributed MIMO system are distributed at different geographical locations, and each pair of transmit and receive links in the distributed MIMO system are more independent. The distributed MIMO system has advantages such as a large capacity, low power consumption, wide coverage, and minor electromagnetic damage to a human body, and is one of alternative solutions to a future wireless communications system. In a case of distributed MIMO, to improve signal reliability of an edge user and improve a throughput of an edge cell, using a multipoint multi-stream transmission method in CoMP transmission/reception may be considered.

Because different transmission points are at different geographical locations, data sent by the different transmission points arrives at a terminal device at different time points. However, in an existing LTE system, a terminal device has only one reception timing for one carrier, and multipoint multi-stream is a technology for transmitting different data by using a same carrier. Therefore, when there is only one reception timing for one carrier, data reception performance is prone to degrade.

SUMMARY

Embodiments of the present disclosure provide a reception timing configuration method and a communications device, to resolve a prior-art technical problem that reception performance degrades because a terminal device has only one reception timing for one carrier.

According to a first aspect, an embodiment of the present disclosure provides a reception timing configuration method, including:

configuring, by a first communications device for a second communications device, a reception timing parameter corresponding to transmission, where the reception timing parameter includes at least two timing points respectively corresponding to at least two transmission points, and the at least two transmission points are configured to transmit downlink data to the terminal device cooperatively; and sending, by the first communications device, indication information to the second communications device, where the indication information is used to indicate the reception timing parameter.

In the solution in this embodiment of the present disclosure, because timing points respectively corresponding to different transmission points are configured for the second communications device, the second communications device may receive, at the timing points, data transmitted by the corresponding transmission points. Therefore, compared with a prior-art method in which a terminal device receives, at a same reception timing, data transmitted by different transmission points, the method in this embodiment of the present disclosure can improve reception performance of the second communications device.

With reference to the first aspect, in a first possible implementation of the first aspect, the method further includes:

receiving, by the first communications device, a capability parameter sent by the second communications device, where the capability parameter is used to indicate that the second communications device supports a plurality of reception timings; and correspondingly, the configuring, by a first communications device for a second communications device, a reception timing parameter corresponding to transmission includes: configuring, by the first communications device for the second communications device based on the capability parameter, the reception timing parameter corresponding to transmission. The method is compatible with a terminal device supporting only one reception timing in the prior art, and can improve reception performance of a terminal device having a function of supporting a plurality of reception timings.

With reference to the first aspect or the first possible implementation of the first aspect, in a second possible implementation of the first aspect, the sending, by the first communications device, indication information to the second communications device includes: sending, by the first communications device, a plurality of groups of timing configuration identifiers and reception timing parameters by using higher layer signaling; and sending, by the first communications device by using physical layer signaling, indication information used to indicate a timing configuration identifier corresponding to transmission.

With reference to the second possible implementation of the first aspect, in a third possible implementation of the first aspect, the sending, by the first communications device by using physical layer signaling, indication information used to indicate a timing configuration identifier corresponding to transmission includes: sending, by the first communications device, the indication information by using downlink control information DCI, where the indication information is used to indicate the corresponding timing configuration identifier and one or any combination of a transmitted codeword, an antenna port, and a quantity of transmission layers of at least one of the at least two transmission points.

With reference to the first aspect or the first possible implementation of the first aspect, in a fourth possible implementation of the first aspect, the sending, by the first communications device, indication information to the second communications device includes: sending, by the first communications device, the indication information by using higher layer signaling or physical layer signaling.

With reference to the first aspect, the first possible implementation of the first aspect, or the fourth possible implementation of the first aspect, in a fifth possible implementation of the first aspect, the indication information is used to indicate identifiers of the at least two transmission points and the corresponding reception timing parameter; or the indication information is used to indicate the corresponding reception timing parameter and one or any combination of a transmitted codeword, an antenna port, and a quantity of transmission layers of at least one of the at least two transmission points.

According to a second aspect, an embodiment of the present disclosure provides a reception timing configuration method, including:

receiving, by a second communications device, indication information sent by a first communications device, where the indication information is used to indicate a reception timing parameter corresponding to transmission, the timing parameter includes at least two timing points respectively corresponding to at least two transmission points, and the at least two transmission points are configured to transmit downlink data to the terminal device cooperatively; and determining, by the second communications device, the reception timing parameter based on the indication information.

With reference to the second aspect, in a first possible implementation of the second aspect, the method further includes:

respectively receiving, by the second communications device at the at least two timing points, the downlink data transmitted by the at least two transmission points in the coordinated manner.

With reference to the second aspect or the first possible implementation of the second aspect, in a second possible implementation of the second aspect, before the receiving, by a second communications device, indication information, the method further includes: sending, by the second communications device, a capability parameter to the first communications device, where the capability parameter is used to indicate that the second communications device supports a plurality of reception timings.

With reference to the second aspect, the first possible implementation of the second aspect, or the second possible implementation of the second aspect, in a third possible implementation of the second aspect, the receiving, by a second communications device, indication information sent by a first communications device includes: receiving, by the second communications device by using higher layer signaling, a plurality of groups of timing configuration identifiers and reception timing parameters that are sent by the first communications device; and receiving, by the second communications device by using physical layer signaling, indication information that is sent by the first communications device and that is used to indicate a timing configuration identifier corresponding to transmission; and correspondingly, the determining, by the second communications device, the reception timing parameter based on the indication information includes: determining, by the second communications device based on the indication information, the timing configuration identifier corresponding to transmission; and determining, by the second communications device in the plurality of groups of timing configuration identifiers and reception timing parameters, a reception timing parameter corresponding to the timing configuration identifier corresponding to transmission.

With reference to the third possible implementation of the second aspect, in a fourth possible implementation of the second aspect, the determining, by the second communications device based on the indication information, the timing configuration identifier corresponding to transmission includes: determining, by the second communications device according to a table that is agreed on in a protocol or preconfigured and that is of a correspondence between indication information and a timing configuration identifier, a timing configuration identifier corresponding to the indication information as the timing configuration identifier corresponding to transmission.

With reference to the second aspect, the first possible implementation of the second aspect, or the second possible implementation of the second aspect, in a fifth possible implementation of the second aspect, the receiving, by a second communications device, indication information sent by a first communications device includes: receiving, by the second communications device by using physical layer signaling, the indication information sent by the first communications device; and correspondingly, the determining, by the second communications device, the reception timing parameter based on the indication information includes: determining, according to a table that is agreed on in a protocol or preconfigured and that is of a correspondence between indication information and a timing value, timing values corresponding to the indication information as the at least two timing points.

With reference to the fourth possible implementation of the second aspect or the fifth possible implementation of the second aspect, in a sixth possible implementation of the second aspect, the correspondence table further includes a correspondence between indication information and one or any combination of a transmitted codeword, an antenna port, and a quantity of transmission layers of at least one of the at least two transmission points.

With reference to the second aspect, the first possible implementation of the second aspect, or the second possible implementation of the second aspect, in a seventh possible implementation of the second aspect, the receiving, by a second communications device, indication information sent by a first communications device includes: receiving, by the second communications device, identifiers of the at least two transmission points and the corresponding reception timing parameter by using higher layer signaling; and correspondingly, the determining, by the second communications device, the reception timing parameter based on the indication information includes: determining, by the second communications device, a corresponding timing value based on an identifier of a transmission point transmitting data.

According to a third aspect, an embodiment of the present disclosure provides a communications device, including:

a processor, configured to configure, for a second communications device, a reception timing parameter corresponding to transmission, where the reception timing parameter includes at least two timing points respectively corresponding to at least two transmission points, and the at least two transmission points are configured to transmit downlink data to the terminal device cooperatively; and a transmitter, configured to send indication information to the second communications device, where the indication information is used to indicate the reception timing parameter.

With reference to the third aspect, in a first possible implementation of the third aspect, the communications device further includes a receiver, where the receiver is configured to receive a capability parameter sent by the second communications device, where the capability parameter is used to indicate that the second communications device supports a plurality of reception timings; and the processor is configured to configure, for the second communications device based on the capability parameter, the reception timing parameter corresponding to transmission.

With reference to the third aspect or the first possible implementation of the third aspect, in a second possible implementation of the third aspect, the transmitter is configured to: send a plurality of groups of timing configuration identifiers and reception timing parameters by using higher layer signaling; and send, by using physical layer signaling, indication information used to indicate a timing configuration identifier corresponding to transmission.

With reference to the second possible implementation of the third aspect, in a third possible implementation of the third aspect, the transmitter is configured to: send the indication information by using downlink control information DCI, where the indication information is used to indicate the corresponding timing configuration identifier and one or any combination of a transmitted codeword, an antenna port, and a quantity of transmission layers of at least one of the at least two transmission points.

With reference to the third aspect or the first possible implementation of the third aspect, in a fourth possible implementation of the third aspect, the transmitter is configured to send the indication information by using higher layer signaling or physical layer signaling.

With reference to the third aspect, the first possible implementation of the third aspect, or the fourth possible implementation of the third aspect, in a fifth possible implementation of the third aspect, the indication information is used to indicate identifiers of the at least two transmission points and the corresponding reception timing parameter; or the indication information is used to indicate the corresponding reception timing parameter and one or any combination of a transmitted codeword, an antenna port, and a quantity of transmission layers of at least one of the at least two transmission points.

According to a fourth aspect, an embodiment of the present disclosure provides a communications device, including:

a receiver, configured to receive indication information sent by a first communications device, where the indication information is used to indicate a reception timing parameter corresponding to transmission, the timing parameter includes at least two timing points respectively corresponding to at least two transmission points, and the at least two transmission points are configured to transmit downlink data to the terminal device cooperatively; and a processor, configured to determine the reception timing parameter based on the indication information.

With reference to the fourth aspect, in a first possible implementation of the fourth aspect, the receiver is further configured to respectively receive, at the at least two timing points, the downlink data transmitted by the at least two transmission points in the coordinated manner.

With reference to the fourth aspect or the first possible implementation of the fourth aspect, in a second possible implementation of the fourth aspect, the communications device further includes a transmitter, configured to send a capability parameter to the first communications device, where the capability parameter is used to indicate that the second communications device supports a plurality of reception timings.

With reference to the fourth aspect, the first possible implementation of the fourth aspect, or the second possible implementation of the fourth aspect, in a third possible implementation of the fourth aspect, the receiver is configured to: receive, by using higher layer signaling, a plurality of groups of timing configuration identifiers and reception timing parameters that are sent by the first communications device; and receive, by using physical layer signaling, indication information that is sent by the first communications device and that is used to indicate a timing configuration identifier corresponding to transmission; and the processor is configured to: determine, based on the indication information, the timing configuration identifier corresponding to transmission; and determine, in the plurality of groups of timing configuration identifiers and reception timing parameters, a reception timing parameter corresponding to the timing configuration identifier corresponding to transmission.

With reference to the third possible implementation of the fourth aspect, in a fourth possible implementation of the fourth aspect, the processor is configured to determine, according to a table that is agreed on in a protocol or preconfigured and that is of a correspondence between indication information and a timing configuration identifier, a timing configuration identifier corresponding to the indication information as the timing configuration identifier corresponding to transmission.

With reference to the fourth aspect, the first possible implementation of the fourth aspect, or the second possible implementation of the fourth aspect, in a fifth possible implementation of the fourth aspect, the receiver is configured to receive, by using physical layer signaling, the indication information sent by the first communications device; and the processor is configured to determine, according to a table that is agreed on in a protocol or preconfigured and that is of a correspondence between indication information and a timing value, timing values corresponding to the indication information as the at least two timing points.

With reference to the fourth aspect or the first possible implementation of the fourth aspect, in a sixth possible implementation of the fourth aspect, the correspondence table further includes a correspondence between indication information and one or any combination of a transmitted codeword, an antenna port, and a quantity of transmission layers of at least one of the at least two transmission points.

With reference to the fourth aspect, the first possible implementation of the fourth aspect, or the second possible implementation of the fourth aspect, in a seventh possible implementation of the fourth aspect, the receiver is configured to receive identifiers of the at least two transmission points and the corresponding reception timing parameter by using higher layer signaling; and the processor is configured to determine a corresponding timing value based on an identifier of a transmission point transmitting data.

According to a fifth aspect, an embodiment of the present disclosure provides a reception timing configuration apparatus, where the configuration apparatus includes a function module configured to implement the method in the first aspect.

According to a sixth aspect, an embodiment of the present disclosure further provides a reception timing configuration apparatus, where the configuration apparatus includes a function module configured to implement the method in the second aspect.

According to a seventh aspect, an embodiment of the present disclosure further provides a computer storage medium, where the computer storage medium stores program code, and the program code includes an instruction used to implement any possible implementation of the method in the first aspect or the second aspect.

DESCRIPTION OF EMBODIMENTS

Embodiments of the present disclosure provide a reception timing configuration method and a communications device, to resolve a prior-art technical problem that reception performance degrades because a terminal device has only one reception timing for one carrier.

The following describes in detail implementation processes and objectives of the solutions in the embodiments of the present disclosure.

Figure 1A:
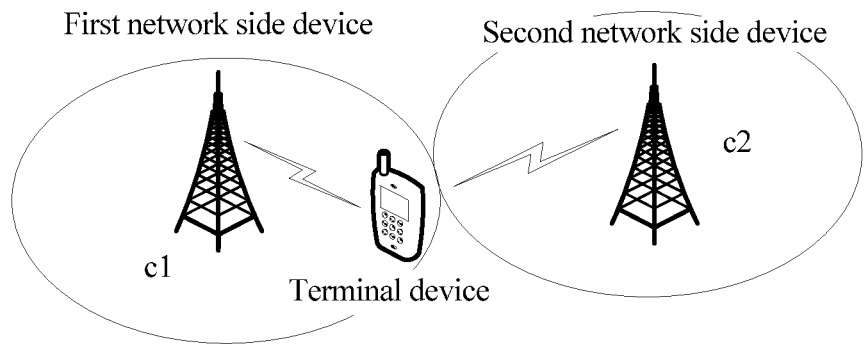
FIG. 1a to FIG. 1c are structural diagrams of communications systems according to an embodiment of the present disclosure.
Figure 1B:
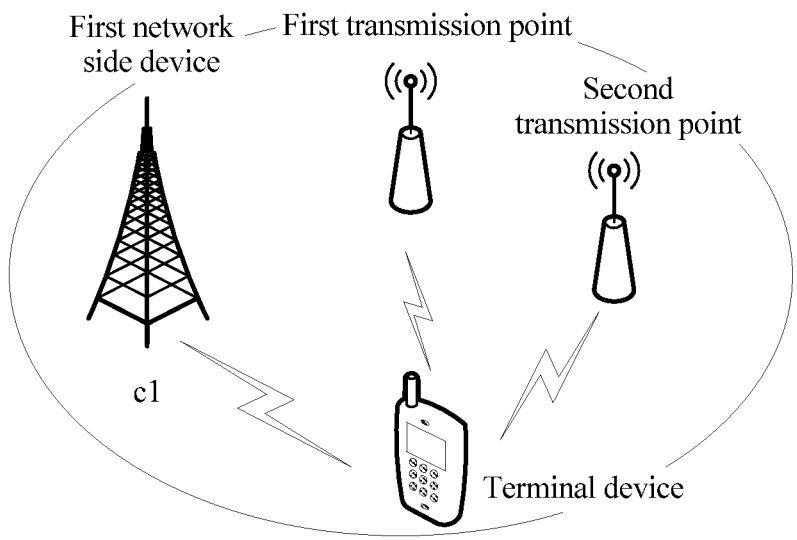
Figure 1C:
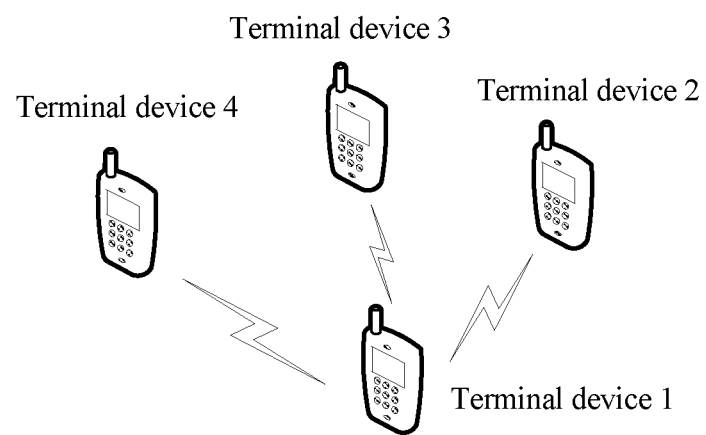

An embodiment of the present disclosure provides a reception timing configuration method. The method may be applied to a communications network system. FIG. 1a, FIG. 1b, and FIG. 1c are structural diagrams of possible communications network systems according to an embodiment of the present disclosure. In a structure shown in FIG. 1a, the communications network system includes a first network side device, a second network side device, and a terminal device. The first network side device is a serving network side device of the terminal device. The serving network side device is a network side device that provides services such as an RRC connection, non-access stratum (NAS) mobility management, and security input for the terminal device by using a wireless air interface protocol. The first network side device may communicate with the terminal device by using the air interface protocol. There may be one or more second network side devices. Generally, the second network side device and the first network side device are at different geographical locations. Usually, the second network side device is a neighboring network side device of the first network side device. The second network side device may also perform data transmission by using the air interface protocol. The second network side device is configured to assist the first network side device in jointly transmitting data to the terminal device, for example, performing multi-stream transmission. Therefore, the second network side device may also be referred to as a coordinated network side device. The first network side device may also communicate with the second network side device, for example, transfer a control message and/or indication information. Optionally, the second network side device may also be a serving network side device of the terminal device.

During actual application, alternatively, the first network side device may be a coordinated network side device, and the second network side device may be a serving network side device.

An area covered by the first network side device is a cell c1. An area covered by the second network side device is c2. In FIG. 1a, the terminal device is located in the cell c1. In other words, the first network side device is a serving network side device. The first network side device and the second network side device transmit data to the terminal device cooperatively through CoMP transmission. In other words, the first network side device and the second network side device are transmission points at different geographical locations.

In a structure shown in FIG. 1b, different from the structure shown in FIG. 1a, different transmission points are transmission points in a cell covered by a same network side device. For example, there are two different transmission points in a cell c1 covered by a first network side device: a first transmission point and a second transmission point. The first transmission point and the second transmission point are, for example, two radio units (RU) relatively far from each other, which are also referred to as radio heads (RH). The first transmission point and the second transmission point transmit data to a terminal device through CoMP transmission.

It should be understood that, only one terminal device (an isolated terminal) and two network side devices are shown in the communications systems shown in FIG. 1a and FIG. 1b, but the present disclosure is not limited thereto. In addition to the two network side devices, the communications system may further include neighboring network side devices that transmit a service on a same time-frequency resource and a terminal device, and a coverage area of each network side device may further include another quantity of terminal devices. Further, optionally, the communications system in which the network side device and the terminal device in FIG. 1a and FIG. 1b are located may include other network entities such as a network controller and/or a mobility management entity. This is not limited in this embodiment of the present disclosure.

In the communications system shown in FIG. 1c, terminal devices communicate with each other in a device-to-device (D2D) communication manner. D2D communication is a new technology that allows, under control of a system, terminal devices to directly communicate with each other by multiplexing a cell resource, and can improve spectral efficiency of a cellular communications system, reduce terminal transmit power, and resolve a problem of lack of spectrum resources in a wireless communications system to some extent. In D2D communication, any two terminal devices can directly communicate with each other without forwarding by a network side device. In FIG. 1c, for example, a terminal device 2, a terminal device 3, and a terminal device 4 serve as different transmission points to jointly send data to a terminal device 1 and jointly receive data sent by the terminal device 1.

The network side device mentioned in this specification may be a base transceiver station (BTS) in a Global System for Mobile Communications (GSM) or Code Division Multiple Access (CDMA), may be a NodeB (NB) in Wideband Code Division Multiple Access (WCDMA), or may be an evolved NodeB (eNB or eNodeB) in Long Term Evolution (LTE), a relay station or an access point, a base station in a future 5G network, or the like. This is not limited in this specification.

The terminal device mentioned in this specification may be a wireless terminal device or may be a wired terminal device. The wireless terminal device may be a device that provides voice and/or other service data connectivity for a user, a handheld device having a wireless connection function, or another processing device connected to a wireless modem. The wireless terminal device may communicate with one or more core networks via a radio access network (RAN). The wireless terminal device may be a mobile terminal, such as a mobile phone (or referred to as a "cellular" phone) or a computer having a mobile terminal, for example, may be a portable, pocket-sized, handheld, computer built-in, or in-vehicle mobile apparatus that exchanges a language and/or data with the radio access network. For example, the wireless terminal device may be a device such as a personal communications service (PCS) phone, a cordless telephone set, a Session Initiation Protocol (SIP) phone, a wireless local loop (WLL) station, or a personal digital assistant (PDA). The wireless terminal device may also be referred to as a system, a subscriber unit, a subscriber station, a mobile station, a mobile console), a remote station, a remote terminal, an access terminal, a user terminal, a user agent, or a user device (User Device or User Equipment).

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Some English abbreviations in this specification are descriptions performed on the embodiments of the present disclosure by using an LTE system as an optional way, and the English abbreviations may change with network evolution. For specific evolution, refer to a description in a corresponding standard.

Figure 2:
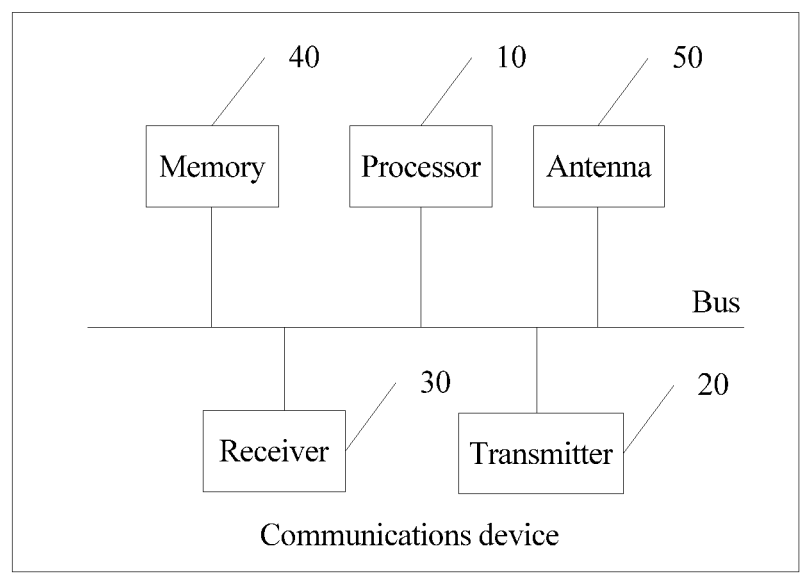
FIG. 2 is a structural diagram of a communications device according to an embodiment of the present disclosure.

FIG. 2 is a possible structural diagram of a communications device according to an embodiment of the present disclosure. The device is, for example, the first network side device, the second network side device, or the terminal device. As shown in FIG. 2, the communications device includes a processor 10, a transmitter 20, a receiver 30, a memory 40, and an antenna 50. The memory 40, the transmitter 20, the receiver 30, and the processor 10 may be connected by using a bus. Certainly, during actual application, the memory 40, the transmitter 20, the receiver 30, and the processor 10 may not be connected by using a bus structure, but by using another structure, such as a star structure. This is not specifically limited in this application.

Optionally, the processor 10 may be specifically a general-purpose central processing unit or an application-specific integrated circuit (ASIC), may be one or more integrated circuits configured to control program execution, may be a hardware circuit developed by using a field programmable gate array (FPGA), or may be a baseband processor.

Optionally, the processor 10 may include at least one processing core.

Optionally, the memory 40 may include one or more of a read-only memory (ROM), a random access memory (RAM), and a disk memory. The memory 40 is configured to store data and/or instructions needed when the processor 10 operates. There may be one or more memories 40.

Optionally, the transmitter 20 and the receiver 30 may be physically independent of each other or may be integrated.

The transmitter 20 may send data by using the antenna 50. The receiver 30 may receive data by using the antenna 50.

Figure 3:
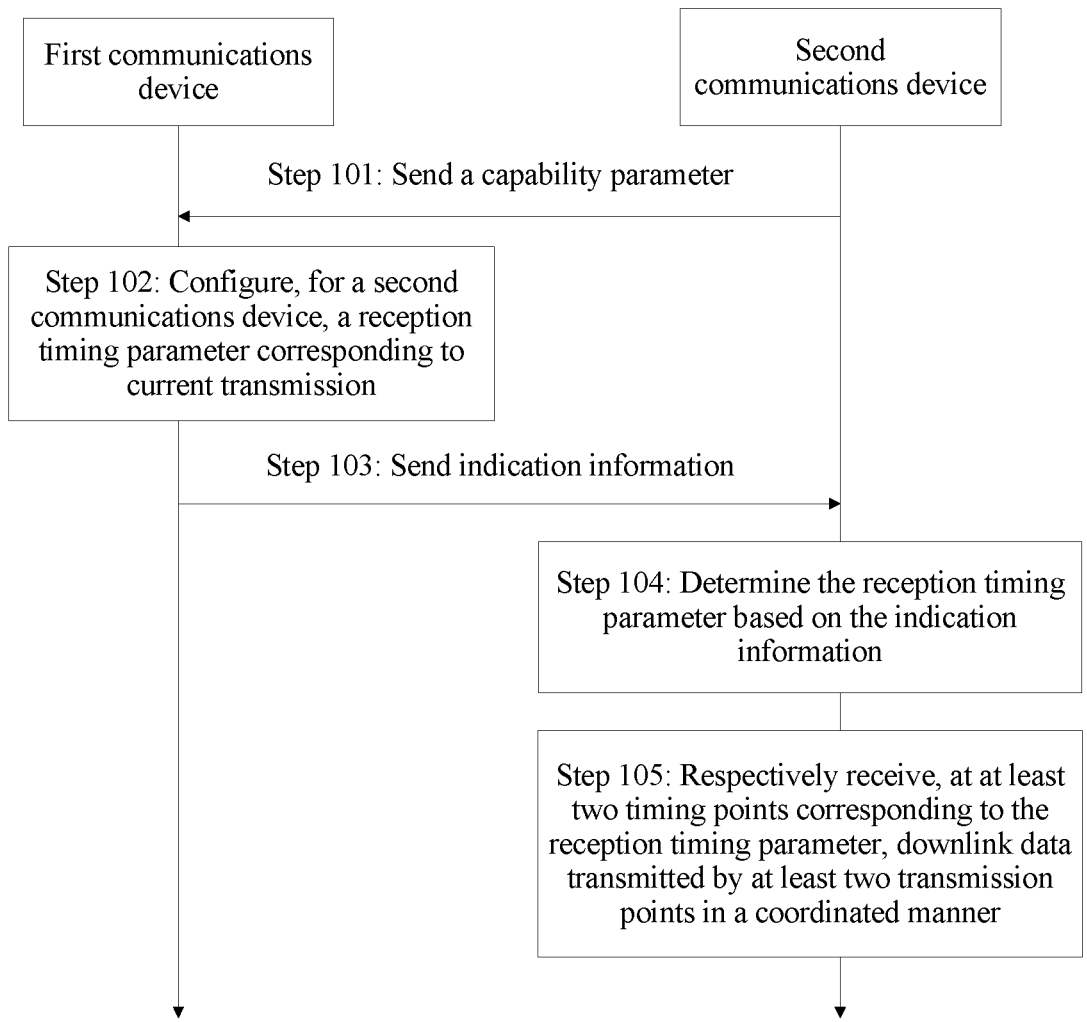
FIG. 3 is a flowchart of a reception timing configuration method according to an embodiment of the present disclosure.

FIG. 3 is a flowchart of a reception timing configuration method according to an embodiment of the present disclosure. As shown in FIG. 3, the method includes the following blocks.

Block 101: A second communications device sends a capability parameter to a first communications device, where the capability parameter is used to indicate that the second communications device supports a plurality of reception timings. An existing second communications device in the prior art does not have a capability of supporting a plurality of reception timings. Therefore, to implement compatibility with the existing second communications device without the capability in the prior art, the second communications device that is applicable to the method in this embodiment of the present disclosure and that has the capability of supporting a plurality of reception timings may perform block 101. Correspondingly, the first communications device may perform block 102 after receiving the capability parameter. If no capability parameter reported by the second communications device is received, an existing processing procedure is performed. With development of technologies, if all second communications devices have the capability in future, block 101 may not be performed, and all first communications devices may perform block 102. Therefore, block 101 is an optional block.

Optionally, the second communications device in block 101 is, for example, the terminal device in the communications system shown in FIG. 1a. The first communications device is a serving network side device of the terminal device, and may be the first network side device in FIG. 1a, may be the second network side device in FIG. 1a, or may be the first network side device and the second network side device in FIG. 1a, in other words, the terminal device may be in communication with both the first network side device and the second network side device.

Optionally, the second communications device in block 101 is, for example, the terminal device in FIG. 1b, and the first communications device is, for example, the first network side device in FIG. 1b.

Optionally, the second communications device in block 101 is, for example, the terminal device 1 in FIG. 1c, and the first communications device is, for example, any one or any combination of the terminal device 2 to the terminal device 4 in FIG. 1c.

First communications devices and second communications devices below all may be understood as meanings described above.

Optionally, the second communications device may perform block 101 when accessing the first communications device each time. For example, when moving from a cell c1 to a cell c2, the terminal device reports the capability parameter to the second network side device.

For another optional way, the terminal device may report the capability parameter to an accessed network side device when accessing a network after startup each time.

Optionally, the second communications device may send the capability parameter to the first communications device by using higher layer signaling. During actual application, new higher layer signaling may be used for sending, or higher layer signaling in the prior art may be reused for sending. The higher layer signaling in the prior art is, for example, radio resource control (RRC) signaling.

For example, the terminal device may add, to a terminal device radio access capability information element (UE-EUTRA-Capability information element) in the RRC signaling, an indication whether multipoint timing reception is supported. A possible code is as follows:

```
UE-EUTRA-Capability information element
UE-EUTRA-Capability-v14x0-IEs ::= SEQUENCE {
    mrt-receiver-Parameters-v14x0    MRT-receiver-Parameters-
                                     v13x0
OPTIONAL,
}
```

In the foregoing code segment, the terminal device radio access capability information element includes three types of capability parameters. A first one is dc-Parameters-v13x0, a second one is measParameters-v13xy, and a third one is the newly added capability parameter mrt-receiver-Parameters-v14x0 used to indicate whether the terminal device supports multipoint timing reception. In this parameter field, whether the terminal device supports multipoint timing reception is defined. Certainly, in the foregoing code segment, another capability parameter in the prior art is not shown.

Still referring to FIG. 3, after the first communications device receives the capability parameter in block 101, or when the first communications device may be configured to perform block 102 without receiving the capability parameter sent by the second communications device, the first communications device performs block 102: The first communications device configures, for the second communications device, a reception timing parameter corresponding to current transmission, where the timing parameter includes at least two timing points respectively corresponding to at least two transmission points, and the at least two transmission points are configured to transmit downlink data to the terminal device cooperatively.

Optionally, the at least two transmission points are, for example, the first network side device and the second network side device in FIG. 1a; or are, for example, the first transmission point and the second transmission point in FIG. 1b; or are, for example, any two or all of the terminal device 2 to the terminal device 4 in FIG. 1c.

Optionally, the at least two timing points correspond to different transmitted codewords, antenna ports, or quantities of transmission layers of the at least two transmission points, or correspond to different combinations of a codeword, an antenna port, and a quantity of transmission layers.

Optionally, data transmitted by the at least two transmission points is different. In this embodiment, that data is different means that data before channel coding is different.

During actual application, block 102 may have a plurality of implementations, which are described below by using possible implementations.

In a first possible implementation, if the first communications device receives the capability parameter sent by the second communications device, and the capability parameter indicates that the second communications device supports a plurality of reception timings, block 102 includes: The first communications device configures, for the second communications device based on the capability parameter, the reception timing parameter corresponding to current transmission. For example, the first communications device configures the reception timing parameter for the second communications device based on a quantity, indicated in the capability parameter, of the plurality of reception timings supported by the second communications device. For example, if the capability parameter indicates that the second communications device can support two reception timings, the first communications device configures, for the second communications device, the reception timing parameter corresponding to current transmission, the reception timing parameter includes at least two timing points, and the two timing points may correspond to at least two transmission points. In other words, in this case, actually, there may be more than two transmission points that transmit downlink data to the second communications device, but only two reception timings are configured in this case. Then the second communications device may receive downlink data at the two reception timings. Compared with only one reception timing in the prior art, a data reception capability of the second communications device is improved.

In a second possible implementation, the second communications device does not limit a quantity of reception timings. Therefore, block 102 includes: The first communications device configures, for the second communications device based on a quantity of transmission points, the reception timing parameter corresponding to current transmission. For example, reception timing points whose quantity is the same as the quantity of transmission points are configured. For example, if a first transmission point and a second transmission point, namely, two transmission points, participate in current transmission, two timing points are configured for the second communications device.

In a third possible implementation, block 102 includes: The first communications device configures, for the second communications device based on a quantity of and geographical locations of transmission points, the reception timing parameter corresponding to current transmission. For example, one reception timing point is configured for transmission points at close geographical locations. Because downlink data sent by the transmission points at close geographical locations to a same second communications device arrives at the second communications device at close times, a same reception timing may be used. For example, a total of four transmission points participate in current transmission, a first transmission point and a second transmission point are at close geographical locations, and a third transmission point and a fourth transmission point are relatively far from each other, and are relatively far from the first transmission point and the second transmission point. Therefore, a total of three reception timing points may be configured, the first transmission point and the second transmission point correspond to one timing point, the third transmission point corresponds to one timing point, and the fourth transmission point corresponds to one timing point.

It can be learned from the foregoing description that, a quantity of two timing points included in the reception timing parameter is less than or equal to a quantity of the at least two transmission points.

During actual application, the reception timing parameter may be configured for the second communications device by comprehensively considering a plurality of factors (for example, a quantity of timings supported by the second communications device, a quantity of transmission points, and geographical locations of the transmission points). For example, if the quantity of timings supported by the second communications device is 2, but there are four transmission points, one timing point is configured for two geographically close transmission points. If the quantity of timings supported by the second communications device is greater than the quantity of transmission points, preferably, one reception timing point is configured for each transmission point.

Certainly, the foregoing opitional ways are only for an illustrative purpose. During actual application, alternatively, the reception timing parameter may be configured for the second communications device by considering another factor. This is not specifically limited in the present disclosure.

The foregoing describes in detail a quantity of configured timing points, and the following describes a specific time point of the reception timing point configured by the first communications device for the at least two transmission points.

In an optional way, the second communications device, such as the terminal device, may send a physical random access channel (PRACH) to the first communications device, such as a base station, in communication with the second communications device, and the first communications device determines the reception timing point based on the PRACH.

In another optional way, the second communications device, such as the terminal device, may send a pilot signal to the second communications device, such as a base station, and the second communications device determines the reception timing based on the pilot signal.

It should be noted that, there may be one or more first communications devices, and a quantity is related to a specific communications system structure. Similarly, the first communications device may be the at least two transmission points, or may be a communications device different from the at least two transmission points. For example, in the communications system shown in FIG. 1a, the first network side device configures, for the terminal device, a reception timing point for the cell c1, and the second network side device configures, for the terminal device, a reception timing point for the cell c2. In this case, the first communications device includes the first network side device and the second network side device, and the first communications device is two transmission points. For another optional way, in the communications system shown in FIG. 1b, the first network side device configures, for the terminal device, reception timing points corresponding to the first transmission point and the second transmission point. In this case, the first communications device is the first network side device, and the first communications device is a network element different from the first transmission point and the second transmission point.

Still referring to FIG. 3, after configuring the reception timing parameter, the first communications device performs block 103. Block 103: The first communications device sends indication information to the second communications device. During actual application, block 103 may also have a plurality of implementations, which are described below by using possible implementation.

In a first possible implementation, block 103 includes: The first communications device sends a plurality of groups of timing configuration identifiers and reception timing parameters by using higher layer signaling; and the first communications device sends, by using physical layer signaling, a timing configuration identifier corresponding to current transmission.

Optionally, the first communications device may use new higher layer signaling or reuse existing higher layer signaling, to send the plurality of groups of timing configuration identifiers and reception timing parameters. The existing higher layer signaling is, for example, RRC signaling. For example, the first communications device configures four groups of timing configuration identifiers and timing values for the second communications device. The first communications device sends the four groups of timing configuration identifiers and timing values by using RRC signaling. A code is shown as follows:

```
Receiver-Timing-Table::=        SEQUENCE {
           receiver-timing-configID            INTEGER (0..3)      //Timing
configuration identifier, which is an integer and whose value ranges from 0 to 3
           receiver-timing             ENUMERATED {16 Ts, 32 Ts, 64 Ts, 128 Ts,
256 Ts, ..., −16 Ts, −32 Ts, −64 Ts, −128 Ts, −256 Ts, ... } //A plurality of timing values are
enumerated
           } OPTIONAL,  -- Need ON
                   or
           Receiver-Timing-Table::=        SEQUENCE {
           receiver-timing-configID            INTEGER (0..3)      //Timing
configuration identifier, which is an integer and whose value ranges from 0 to 3
           receiver-timing-error      ENUMERATED {16 Ts, 32 Ts, 64 Ts, 128 Ts,
256 Ts, ..., −16 Ts, −32 Ts, −64 Ts, −128 Ts, −256 Ts, ... }   //A plurality of timing values
are enumerated
           } OPTIONAL,  -- Need ON
       }
```

In the foregoing code, receiver-timing-configID represents a timing configuration identifier, which is an integer and whose value may be set depending on an actual condition; and receiver-timing represents a timing value, namely, a timing point, and a plurality of reception timing parameters are enumerated in a timing value field (receiver-timing), for example, relative timing values, such as {16 Ts, 32 Ts, 64 Ts, 128 Ts, 256 Ts, . . . , −16 Ts, −32 Ts, −64 Ts, −128 Ts, −256 Ts, . . . }. The plurality of timing values are the at least two timing points configured in block 102. It should be noted that, each of the timing values {16 Ts, 32 Ts, 64 Ts, 128 Ts, 256 Ts, . . . , −16 Ts, −32 Ts, −64 Ts, −128 Ts, −256 Ts, . . . } represents a relative time value, and a relative reference is a time point after the first communications device and the second communications device perform time synchronization. For example, 16 Ts represents an offset of 16 Ts relative to the time point after synchronization, where Ts is a time unit. Certainly, during actual application, the timing value may be represented in another form, for example, using an absolute time value. This is not specifically limited in the present disclosure.

In addition, in the foregoing code segment, a timing value corresponding to receiver-timing is a timing value for a serving cell, such as a timing value for the cell c1 in FIG. 1a, and a timing value corresponding to receiver-timing-error is, for example, a timing value for a neighboring cell, such as a timing value for the cell c2 in FIG. 1a, which is also a relative time value.

Then the first communications device sends, to the second communications device by using physical layer signaling, indication information used to indicate a timing configuration identifier corresponding to transmission. Optionally, the physical layer signaling in this embodiment may be new physical layer signaling, or existing physical layer signaling may be reused. The physical layer signaling may be carried by using a physical downlink control channel, for example, be carried by using a physical downlink control channel (PDCCH) in an LTE system; or may be carried by using a channel that emerges with system evolution, that implements a downlink physical control function, and that has another name.

In the LTE system, the existing physical layer signaling is, for example, downlink control information (DCI).

Optionally, the reception timing parameter corresponding to transmission is a reception timing parameter corresponding to one or any combination of a transmitted codeword, an antenna port, and a quantity of transmission layers of at least one of the at least two transmission points. In other words, in this embodiment of the present disclosure, reception timings may be set based on transmitted codewords, used antenna ports, or quantities of transmission layers of different transmission points, so that reception performance is further improved.

It should be noted that, during actual application, two transmission points may not simultaneously perform transmission, and then block 103 and block 102 may be performed a plurality of times. For example, it is assumed that the terminal device accesses a serving cell c1. In this case, the indication information indicates a reception timing parameter for the serving cell c1. Then an inter-base station coordinated cell c2 also prepares to transmit data to the terminal device. In this case, a reception timing parameter for the cell c2 should to be indicated, and the terminal device receives the data at a corresponding timing point.

If two transmission points simultaneously transmit data, block 103 may be performed once to simultaneously indicate a reception timing parameter for both of the two transmission points.

The antenna port is a logical port for transmission, and is not in a one-to-one correspondence with a physical antenna 50 in definition. The antenna port is defined by using a reference signal of the antenna port. In other words, the used reference signal is a name of a type of logical port. Specifically, antenna ports p=0, p={0, 1}, and p={0, 1, 2, 3} are ports that are based on a cell-specific (cell-specific) reference signal; an antenna port p=4 is a port that is based on a multicast broadcast single frequency network (MBSFN) reference signal; and an antenna port p=5 is a port that is based on a user equipment-specific (UE-specific) reference signal.

That the first communications device sends, by using physical layer signaling, a timing configuration identifier corresponding to transmission is described below by using an optional way.

Table 1 shows an optional way of sending, by using existing DCI, indication information used to indicate a timing configuration identifier. Table 1 shows an optional way of adding a timing configuration identifier $n_{TCID}$ to an existing table of a relationship between a codeword, an antenna port, a quantity of transmission layers, and $n_{SCID}$. Herein, $N_{SCID}$ represents a scrambling identifier, and is a parameter used to generate a downlink demodulation reference signal (DMRS) sequence. The parameter is well-known content in the art, and therefore details are not described herein.

TABLE 1

| One codeword: a codeword 0 is enabled, and a codeword 1 is disabled | | Two codewords: a codeword 0 is enabled, and a codeword 1 is enabled | |
| --- | --- | --- | --- |
| Value | Information | Value | Information |
| 0 | One layer, antenna port 7, $n_{SCID} = 0$, and $n_{TCID} = 0$ | 0 | Two layers, antenna ports 7 and 8, $n_{SCID} = 0$, and $n_{TCID} = 1$ |
| 1 | One layer, antenna port 7, $n_{SCID} = 1$, and $n_{TCID} = 0$ | 1 | Two layers, antenna ports 7 and 8, $n_{SCID} = 1$, and $n_{TCID} = 2$ |
| 2 | One layer, antenna port 8, $n_{SCID} = 0$, and $n_{TCID} = 1$ | 2 | Three layers, antenna ports 7 to 9, and $n_{TCID} = 1$ |
| 3 | One layer, antenna port 8, $n_{SCID} = 1$, and $n_{TCID} = 1$ | 3 | Four layers, antenna ports 7 to 10, and $n_{TCID} = 2$ |
| 4 | Two layers, antenna ports 7 and 8, and $nn_{TCID} = 2$ | 4 | Five layers, antenna ports 7 to 11, and $n_{TCID} = 1$ |
| 5 | Three layers, antenna ports 7 to 9, and $n_{TCID} = 1$ Three layers, antenna ports 7 and 8, and $n_{TCID} = 1$ antenna port 9, and $n_{TCID} = 2$ | 5 | Six layers, antenna ports 7 to 12, and $n_{TCID} = 2$ Six layers, antenna ports 7 to 9, and $n_{TCID} = 1$ antenna ports 10 to 12, and $n_{TCID} = 2$ |
| 6 | Four layers, antenna ports 7 to 10, and $n_{TCID} = 2$ Four layers, antenna ports 7 and 8, and $n_{TCID} = 1$ antenna ports 9 and 10, and $n_{TCID} = 2$ | 6 | Seven layers, antenna ports 7 to 13, and $n_{TCID} = 2$ Seven layers, antenna ports 7 to 10, and $n_{TCID} = 1$ antenna ports 11 to 13, and $n_{TCID} = 2$ |
| 7 | Reserved | 7 | Eight layers, and antenna ports 7 to 14 |

Table 1 gives a timing configuration identifier corresponding to a combination of a codeword, an antenna port, and a quantity of transmission layers. Table 1 is a table that is agreed on in a protocol or preconfigured by a system. In Table 1, values 0 to 7 represent indication information; and during actual application, may be represented by using a three-bit binary value. The indication information transmitted by using the DCI is 0 to 7. For example, when only the codeword 0 is enabled, if the indication information is 6, it indicates that the antenna ports 7 to 10 are used to transmit four layers of data. The antenna ports 7 and 8 transmit a first codeword, and $n_{TCID} = 1$ indicates that a used timing configuration identifier is 1, in other words, a timing value is a timing value corresponding to the timing configuration identifier 1. The antenna ports 9 and 10 are used to transmit a second codeword, and $n_{TCID}=2$ indicates that a timing configuration identifier is 2, in other words, a timing value is a timing value corresponding to the timing configuration identifier 2. The second communications device may determine a reception timing value of the second communications device in correspondences between the plurality of groups of timing configuration identifiers and reception timing parameters based on the timing configuration identifier.

Optionally, a newly added table may be selected to indicate a relationship between an antenna port, a codeword, a quantity of transmission layers, and a timing configuration identifier. Then the table is agreed on in a protocol or preconfigured by a system. Indication may be performed separately or jointly. Separate indication means that, an antenna port, a codeword, or a quantity of transmission layers is known, in other words, the terminal device knows the antenna port, the codeword, or the quantity of transmission layers; and therefore an indicator field indicates only a timing configuration identifier corresponding to the antenna port, the codeword, or the quantity of transmission layers. Joint indication means that, an indicator field is used to indicate both an antenna port, a codeword, or a quantity of transmission layers, and a timing configuration identifier corresponding to the antenna port, the codeword, or the quantity of transmission layers. Therefore, the terminal device may obtain, by using the indicator field, both the antenna port, the codeword, or the quantity of transmission layers, and the timing configuration identifier corresponding to the antenna port, the codeword, or the quantity of transmission layers.

For example, Table 2 shows an optional way of separately indicating a relationship between an antenna port and a timing configuration identifier in a case of two antenna ports.

TABLE 2

| Value | Information |
|---|---|
| 0 | Antenna port 7, and $n_{TCID} = 0$ |
| | Antenna port 8, and $n_{TCID} = 0$ |
| 1 | Antenna port 7, and $n_{TCID} = 0$ |
| | Antenna port 8, and $n_{TCID} = 1$ |
| 2 | Antenna port 7, and $n_{TCID} = 0$ |
| | Antenna port 8, and $n_{TCID} = 2$ |
| 3 | Antenna port 7, and $n_{TCID} = 0$ |
| | Antenna port 8, and $n_{TCID} = 3$ |

Table 3 shows an optional way of separately indicating an indication relationship between an antenna port and a timing configuration identifier in a case of four antenna ports.

TABLE 3

| Value | Information |
|---|---|
| 0 | Antenna ports 7 and 8, and $n_{TCID} = 0$ |
| | Antenna ports 9 and 10, and $n_{TCID} = 0$ |
| 1 | Antenna ports 7 and 8, and $n_{TCID} = 0$ |
| | Antenna ports 9 and 10, and $n_{TCID} = 1$ |
| 2 | Antenna ports 7 and 8, and $n_{TCID} = 0$ |
| | Antenna ports 9 and 10, and $n_{TCID} = 2$ |
| 3 | Antenna ports 7 and 8, and $n_{TCID} = 1$ |
| | Antenna ports 9 and 10, and $n_{TCID} = 2$ |

TABLE 3-continued

| Value | Information |
|---|---|
| 4 | Antenna port 7, and $n_{TCID} = 0$ |
| | Antenna ports 8 to 10, and $n_{TCID} = 1$ |
| 5 | Antenna port 7, and $n_{TCID} = 0$ |
| | Antenna ports 8 to 10, and $n_{TCID} = 2$ |
| 6 | Antenna ports 7 to 9, and $n_{TCID} = 1$ |
| | Antenna port 10, and $n_{TCID} = 1$ |
| 7 | Antenna ports 7 to 9, and $n_{TCID} = 0$ |
| | Antenna port 10, and $n_{TCID} = 2$ |

Table 4 shows an optional way of jointly indicating a relationship between an antenna port and a timing configuration identifier.

TABLE 4

| Value | Information |
|---|---|
| 0 | Antenna port 7, and $n_{TCID} = 0$ |
| | Antenna port 8, and $n_{TCID} = 0$ |
| 1 | Antenna port 7, and $n_{TCID} = 0$ |
| | Antenna port 8, and $n_{TCID} = 1$ |
| 2 | Antenna port 7, and $n_{TCID} = 0$ |
| | Antenna port 8, and $n_{TCID} = 2$ |
| 3 | Antenna ports 7 and 8, and $n_{TCID} = 0$ |
| | Antenna port 9, and $n_{TCID} = 1$ |
| 4 | Antenna port 7, and $n_{TCID} = 0$ |
| | Antenna ports 8 and 9, and $n_{TCID} = 1$ |
| 5 | Antenna ports 7 and 8, and $n_{TCID} = 0$ |
| | Antenna ports 9 and 10, and $n_{TCID} = 0$ |
| 6 | Antenna ports 7 and 8, and $n_{TCID} = 0$ |
| | Antenna ports 9 and 10, and $n_{TCID} = 1$ |
| 7 | Antenna ports 7 to 9, and $n_{TCID} = 0$ |
| | Antenna port 10, and $n_{TCID} = 2$ |

Table 5 is a table example of separately indicating a relationship between a codeword and a timing configuration identifier in a case of two codewords.

TABLE 5

| Value | Information |
|---|---|
| 0 | Codeword 0, and $n_{TCID} = 0$ |
| | Codeword 1, and $n_{TCID} = 0$ |
| 1 | Codeword 0, and $n_{TCID} = 0$ |
| | Codeword 1, and $n_{TCID} = 1$ |
| 2 | Codeword 0, and $n_{TCID} = 0$ |
| | Codeword 1, and $n_{TCID} = 2$ |
| 3 | Codeword 0, and $n_{TCID} = 0$ |
| | Codeword 1, and $n_{TCID} = 3$ |

Table 6 is a table example of separately indicating a relationship between a codeword and a timing configuration identifier in a case of four codewords.

TABLE 6

| Value | Information |
|---|---|
| 0 | Codewords 0 and 1, and $n_{TCID} = 0$<br>Codewords 2 and 3, and $n_{TCID} = 0$ |
| 1 | Codewords 0 and 1, and $n_{TCID} = 0$<br>Codewords 2 and 3, and $n_{TCID} = 1$ |
| 2 | Codewords 0 and 1, and $n_{TCID} = 0$<br>Codewords 2 and 3, and $n_{TCID} = 2$ |
| 3 | Codewords 0 and 1, and $n_{TCID} = 0$<br>Codewords 2 and 3, and $n_{TCID} = 3$ |
| 4 | Codewords 0 and 1, and $n_{TCID} = 1$<br>Codewords 2 and 3, and $n_{TCID} = 2$ |
| 5 | Codewords 0 and 1, and $n_{TCID} = 1$<br>Codewords 2 and 3, and $n_{TCID} = 3$ |
| 6 | Codewords 0 and 1, and $n_{TCID} = 2$<br>Codewords 2 and 3, and $n_{TCID} = 3$ |
| 7 | Reserved |

Table 7 is a table example of jointly indicating a relationship between a codeword and a timing configuration identifier.

TABLE 7

| Value | Information |
|---|---|
| 0 | Codeword 0, and $n_{TCID} = 0$<br>Codeword 1, and $n_{TCID} = 0$ |
| 1 | Codeword 0, and $n_{TCID} = 0$<br>Codeword 1, and $n_{TCID} = 1$ |
| 2 | Codeword 0, and $n_{TCID} = 0$<br>Codeword 1, and $n_{TCID} = 2$ |
| 3 | Codewords 0 and 1, and $n_{TCID} = 0$<br>Codeword 2, and $n_{TCID} = 1$ |
| 4 | Codewords 0 and 1, and $n_{TCID} = 0$<br>Codeword 2, and $n_{TCID} = 2$ |
| 5 | Codewords 0 and 1, and $n_{TCID} = 0$<br>Codewords 2 and 3, and $n_{TCID} = 0$ |
| 6 | Codewords 0 and 1, and $n_{TCID} = 0$<br>Codewords 2 and 3, and $n_{TCID} = 1$ |
| 7 | Codewords 0 and 1, and $n_{TCID} = 0$<br>Codewords 2 and 3, and $n_{TCID} = 2$ |

Table 8 shows an optional way of separately indicating a relationship between a layer number and a timing configuration identifier in a case of two transmission layers.

TABLE 8

| Value | Information |
|---|---|
| 0 | Layer 0, and $n_{TCID} = 0$; layer 1, and $n_{TCID} = 0$ |
| 1 | Layer 0, and $n_{TCID} = 0$; layer 1, and $n_{TCID} = 1$ |
| 2 | Layer 0, and $n_{TCID} = 0$; layer 1, and $n_{TCID} = 2$ |
| 3 | Layer 0, and $n_{TCID} = 0$; layer 1, and $n_{TCID} = 3$ |

Table 9 shows an optional way of separately indicating a relationship between a layer number and a timing configuration identifier in a case of four layers.

TABLE 9

| Value | Information |
|---|---|
| 0 | Layers 0 and 1, and $n_{TCID} = 0$<br>Layers 2 and 3, and $n_{TCID} = 0$ |
| 1 | Layers 0 and 1, and $n_{TCID} = 0$<br>Layers 2 and 3, and $n_{TCID} = 1$ |
| 2 | Layers 0 and 1, and $n_{TCID} = 0$<br>Layers 2 and 3, and $n_{TCID} = 2$ |
| 3 | Layers 0 and 1, and $n_{TCID} = 1$<br>Layers 2 and 3, and $n_{TCID} = 2$ |
| 4 | Layer 0, and $n_{TCID} = 0$<br>Layers 1 to 3, and $n_{TCID} = 1$ |
| 5 | Layer 0, and $n_{TCID} = 0$<br>Layers 1 to 3, and $n_{TCID} = 2$ |
| 6 | Layers 0 to 2, and $n_{TCID} = 0$<br>Layer 3, and $n_{TCID} = 1$ |
| 7 | Layers 0 to 2, and $n_{TCID} = 0$<br>Layer 3, and $n_{TCID} = 2$ |

Table 10 shows an optional way of jointly indicating a relationship between a quantity of transmission layers and a timing configuration identifier.

TABLE 10

| Value | Information |
|---|---|
| 0 | Layer 0, and $n_{TCID} = 0$<br>Layer 1, and $n_{TCID} = 0$ |
| 1 | Layer 0, and $n_{TCID} = 0$<br>Layer 1, and $n_{TCID} = 1$ |
| 2 | Layer 0, and $n_{TCID} = 0$<br>Layer 1, and $n_{TCID} = 2$ |
| 3 | Layers 0 and 1, and $n_{TCID} = 0$<br>Layer 2, and $n_{TCID} = 0$ |
| 4 | Layers 0 and 1, and $n_{TCID} = 0$<br>Layer 2, and $n_{TCID} = 1$ |
| 5 | Layer 0, and $n_{TCID} = 0$<br>Layers 1 and 2, and $n_{TCID} = 1$ |
| 6 | Layers 0 and 1, and $n_{TCID} = 0$<br>Layers 2 and 3, and $n_{TCID} = 0$ |
| 7 | Layers 0 and 1, and $n_{TCID} = 0$<br>Layers 2 and 3, and $n_{TCID} = 2$ |

In the foregoing Table 2 to Table 10, a value field is indication information. If a relationship between a timing configuration identifier and two or more of a quantity of layers, a codeword, and an antenna port is configured, the first communications device may further indicate that the indication information is in which table, for example, indication information 0 is in Table 2, and indication information 3 is in Table 10. Correspondingly, when receiving the indication information, the second communications device may obtain a timing configuration identifier by querying the table corresponding to the indication information, and then determine a reception timing parameter in the correspondences between the plurality of groups of timing configuration identifiers and reception timing parameters based on the timing configuration identifier.

In a second possible implementation of block 103, block 103 includes: The first communications device sends the indication information by using higher layer signaling or physical layer signaling.

The higher layer signaling in this embodiment may be new higher layer signaling, or existing higher layer signaling may be reused. The existing higher layer signaling is, for example, RRC signaling in the LTE system.

The physical layer signaling in this embodiment may be new physical layer signaling, or existing physical layer signaling may be reused. The physical layer signaling may be carried by using a physical downlink control channel, for example, be carried by using a PDCCH in an LTE system; or may be carried by using a channel that emerges with system evolution, that implements a downlink physical control function, and that has another name.

In the LTE system, the existing physical layer signaling is, for example, downlink control information (DCI).

The following provides a description still by using an optional way of adding a reception timing parameter in an existing table of a relationship between a codeword, an antenna port, a quantity of transmission layers, and $n_{SCID}$. Referring to Table 11 and Table 12, a reception timing is newly added information.

TABLE 11

| One codeword: a codeword 0 is enabled, and a codeword 1 is disabled | | Two codewords: a codeword 0 is enabled, and a codeword 1 is enabled | |
|---|---|---|---|
| Value | Information | Value | Information |
| 0 | One layer, antenna port 7, $n_{SCID}$ = 0, and reception timing = 160 $T_s$ | 0 | Two layers, antenna ports 7 and 8, $n_{SCID}$ = 0, and reception timing = 160 $T_s$ |
| 1 | One layer, antenna port 7, $n_{SCID}$ = 1, and reception timing = (160 + 16) $T_s$ | 1 | Two layers, antenna ports 7 and 8, $n_{SCID}$ = 1, and reception timing = (160 + 16) $T_s$ |
| 2 | One layer, antenna port 8, $n_{SCID}$ = 1, and reception timing = 160 $T_s$ | 2 | Three layers, antenna ports 7 to 9, and reception timing = 160 $T_s$ |
| 3 | One layer, antenna port 8, $n_{SCID}$ = 1, and reception timing = (160 + 16) $T_s$ | 3 | Four layers, antenna ports 7 to 10, and reception timing = 160 $T_s$ |
| 4 | Two layers, antenna ports 7 and 8, and reception timing = 160 $T_s$ | 4 | Five layers, antenna ports 7 to 11, and reception timing = 160 $T_s$ |
| 5 | Three layers, antenna ports 7 to 9, and reception timing = 160 $T_s$ | 5 | Six layers, antenna ports 7 to 12, and reception timing = 160 $T_s$ |
| 6 | Four layers, antenna ports 7 to 10, and reception timing = 160 $T_s$ | 6 | Seven layers, antenna ports 7 to 13, and reception timing = 160 $T_s$ |
| 7 | Reserved | 7 | Eight layers, antenna ports 7 to 14, and reception timing = 160 $T_s$ |

TABLE 12

| One codeword: a codeword 0 is enabled, and a codeword 1 is disabled | | Two codewords: a codeword 0 is enabled, and a codeword 1 is enabled | |
|---|---|---|---|
| Value | Information | Value | Information |
| 0 | One layer, antenna port 7, $n_{SCID}$ = 0, and reception timing = 160 $T_s$ | 0 | Two layers, antenna ports 7 and 8, $n_{SCID}$ = 0, and reception timing = 160 $T_s$ |
| 1 | One layer, antenna port 7, $n_{SCID}$ = 1, and reception timing = 160 $T_s$ | 1 | Two layers, antenna ports 7 and 8, $n_{SCID}$ = 1, and reception timing = 160 $T_s$ |
| 2 | One layer, antenna port 8, $n_{SCID}$ = 0, and reception timing = 160 $T_s$ | 2 | Three layers, antenna ports 7 to 9, and reception timing = 160 $T_s$ |
| 3 | One layer, antenna port 8, $n_{SCID}$ = 1, and reception timing = 160 $T_s$ | 3 | Four layers, antenna ports 7 to 10, and reception timing = 160 $T_s$ |
| 4 | Two layers, antenna ports 7 and 8, and reception timing = 160 $T_s$ | 4 | Five layers, antenna ports 7 to 11, and reception timing = 160 $T_s$ |
| 5 | Three layers, antenna ports 7 to 9, and reception timing = 160 $T_s$ | 5 | Six layers, antenna ports 7 to 12, and reception timing = 160 $T_s$ |
| 6 | Four layers, antenna ports 7 to 10, and reception timing = 160 $T_s$ | 6 | Seven layers, antenna ports 7 to 13, and reception timing = 160 $T_s$ |

TABLE 12-continued

| One codeword: a codeword 0 is enabled, and a codeword 1 is disabled | | Two codewords: a codeword 0 is enabled, and a codeword 1 is enabled | |
|---|---|---|---|
| Value | Information | Value | Information |
| 7 | Reserved | 7 | Eight layers, antenna ports 7 to 14, and reception timing = 160 $T_s$ |
| 8 | One layer, antenna port 7, $n_{SCID}$ = 0, and reception timing = (160 + 16) $T_s$ | 8 | Two layers, antenna ports 7 and 8, $n_{SCID}$ = 0, and reception timing = (160 + 16) $T_s$ |
| 9 | One layer, antenna port 7, $n_{SCID}$ = 1, and reception timing = (160 + 16) $T_s$ | 9 | Two layers, antenna ports 7 and 8, $n_{SCID}$ = 1, and reception timing = (160 + 16) $T_s$ |
| 10 | One layer, antenna port 8, $n_{SCID}$ = 0, and reception timing = (160 + 16) $T_s$ | 10 | Three layers, antenna ports 7 to 9, and reception timing = (160 + 16) $T_s$ |
| 11 | One layer, antenna port 8, $n_{SCID}$ = 1, and reception timing = (160 + 16) $T_s$ | 11 | Four layers, antenna ports 7 to 10, and reception timing = (160 + 16) $T_s$ |
| 12 | Two layers, antenna ports 7 and 8, and reception timing = (160 + 16) $T_s$ | 12 | Five layers, antenna ports 7 to 11, and reception timing = (160 + 16) $T_s$ |
| 13 | Three layers, antenna ports 7 to 9, and reception timing = (160 + 16) $T_s$ | 13 | Six layers, antenna ports 7 to 12, and reception timing = (160 + 16) $T_s$ |
| 14 | Four layers, antenna ports 7 to 10, and reception timing = (160 + 16) $T_s$ | 14 | Seven layers, antenna ports 7 to 13, and reception timing = (160 + 16) $T_s$ |
| 15 | Reserved | 15 | Eight layers, antenna ports 7 to 14, and reception timing = (160 + 16) $T_s$ |

In Table 11, different from Table 1, a reception timing parameter rather than a timing configuration identifier is directly added. For example, when the codeword 0 is enabled, the codeword 1 is disabled, a quantity of transmission layers is 1, and an antenna port is the port 7, a reception timing is 160 $T_s$. Assuming that a reception timing of a serving cell is used as a reference, a reception timing (160+16) $T_s$ may indicate that a difference between a reception timing of the antenna port 7 and the reception timing of the serving cell is 160 $T_s$, in other words, data of the antenna port 7 is received at a timing 160 $T_s$ later than that of the serving cell.

A difference between Table 12 and Table 11 is that, indication information has three bits in Table 11, while indication information has four bits in Table 12.

Another case in which the first communications device sends the indication information by using physical layer signaling is as follows: In this case, block 102 may be specifically: configuring, for the second communications device according to a rule agreed on in a protocol, the reception timing parameter corresponding to current transmission.

The physical layer signaling in this embodiment may be new physical layer signaling, or existing physical layer signaling may be reused. The physical layer signaling may be carried by using a physical downlink control channel, for example, be carried by using a PDCCH in an LTE system; or may be carried by using a channel that emerges with system evolution, that implements a downlink physical control function, and that has another name.

For example, a reception timing parameter agreed on in a protocol is shown in Table 13.

TABLE 13

| Value | Information |
|---|---|
| 00 | 160 $T_s$ |
| 01 | (160 + 16) $T_s$ |

TABLE 13-continued

| Value | Information |
|---|---|
| 10 | (160 + 16 × 2) $T_s$ |
| 11 | (160 + 16 × 3) $T_s$ |

In Table 13, there are four pieces of indication information, each piece of indication information has two bits, and the four pieces of indication information are respectively 00, 01, 10, and 11. Each piece of indication information corresponds to one group of timing points. Therefore, in block 102, the first communications device may configure one group of timing points for the second communications device. For example, assuming that a reception timing of a serving cell is used as a reference, a reception timing (160+16) $T_s$ may indicate that a difference between a reception timing of the antenna port 7 and the reception timing of the serving cell is (160+16) $T_s$, in other words, data of the antenna port 7 is received at a timing (160+16) $T_s$ later than that of the serving cell.

Then in block 103, the first communications device may reuse existing physical layer signaling, such as existing transport block information, to send the indication information, to be specific, add two-bit indication information, such as 01, to the existing transport block information. Correspondingly, the second communications device may query Table 13 based on the indication information, to determine a reception timing value.

In a third possible implementation of block 103, block 103 includes: The first communications device sends identifiers of the at least two transmission points and the corresponding reception timing parameter by using higher layer signaling. Similarly, a timing value in this embodiment may be an absolute time value, or may be a relative time value, such as a time difference between transmission points.

Specifically, for example, the first communications device configures one timing value for each transmission point, and sends an identifier of each transmission point and the timing value corresponding to each transmission point to the second communications device. Therefore, based on an identifier of a transmission point in current transmission, the second communications device can determine a reception timing value of the transmission point.

Still referring to FIG. 3, after block 103, correspondingly, the second communications device receives the indication information, and then the second communications device performs block 104: The second communications device determines the reception timing parameter based on the indication information.

Corresponding to the first possible implementation of block 103, block 104 includes: The second communications device determines, based on the indication information, the timing configuration identifier corresponding to transmission; and determines, in the plurality of groups of timing configuration identifiers and reception timing parameters, a reception timing parameter corresponding to the timing configuration identifier corresponding to current transmission. Optionally, that the second communications device determines, based on the indication information, the timing configuration identifier corresponding to transmission includes: The second communications device determines, according to a table that is agreed on in a protocol or preconfigured and that is of a correspondence between indication information and a timing configuration identifier, a timing configuration identifier corresponding to the indication information as the timing configuration identifier corresponding to transmission. Optionally, the correspondence table further includes a correspondence between indication information and one or any combination of a transmitted codeword, an antenna port, and a quantity of transmission layers of at least one of the at least two transmission points.

For example, referring to the correspondence table shown in Table 1, when the codeword 0 is enabled, and the codeword 1 is disabled, if the indication information is 0, it indicates that one codeword is transmitted, and is sent through the antenna port 7, a quantity of transmission layers is 1, and a corresponding timing configuration identifier is 0. Then at least two timing values corresponding to the timing configuration identifier 0 are determined in the plurality of groups of timing configuration identifiers and reception timing parameters based on the timing configuration identifier 0.

Corresponding to the second possible implementation of block 103, block 104 includes: The second communications device determines, according to a table that is agreed on in a protocol or preconfigured and that is of a correspondence between indication information and a timing value, timing values corresponding to the indication information as the at least two timing points.

Optionally, the correspondence table further includes a correspondence between indication information and one or any combination of a transmitted codeword, an antenna port, and a quantity of transmission layers of at least one of the at least two transmission points.

For example, referring to the correspondence table shown in Table 11, when the codeword 0 is enabled, and the codeword 1 is disabled, if the indication information is 0, a corresponding quantity of transmission layers is 1, an antenna port is the port 7, and a reception timing is 160 $T_s$. Assuming that a reception timing of a serving cell is used as a reference, a reception timing 160 $T_s$ may indicate that a difference between a reception timing of the antenna port 7 and the reception timing of the serving cell is 160 $T_s$, in other words, data of the antenna port 7 is received at a timing 160 $T_s$ later than that of the serving cell.

For another optional way, referring to Table 13, assuming that the second communications device obtains two-bit indication information 01 by parsing transport block information, the second communications device may query Table 13 to determine that the reception timing parameter corresponding to current transmission is (160+16) $T_s$.

Corresponding to the third possible implementation of block 103, block 104 includes: The second communications device determines a corresponding timing value based on an identifier of a transmission point transmitting data. For example, the first communications device sends, by using RRC signaling, an identifier of each transmission point and a timing value corresponding to each transmission point. In this case, the second communications device determines, based on an identifier of a transmission point in current transmission, a timing value corresponding to the transmission point, for example, respectively determines, based on an identifier of a first transmission point and an identifier of a second transmission point, a timing value corresponding to the first transmission point and a timing value corresponding to the second transmission point.

After determining the reception timing parameter, the second communications device may perform block 105. Block 105: The second communications device respectively receives, at the at least two timing points corresponding to the reception timing parameter, the downlink data transmitted by the at least two transmission points in the coordinated manner.

It can be learned from the foregoing description that, in the solution in this embodiment of the present disclosure, the capability of supporting a plurality of reception timings is configured for the second communications device, and the first communications device configures the at least two reception timings for the second communications device, so that different data sent by using a same frequency can correspond to respective reception timings, thereby improving reception performance.

Based on a same disclosure idea, an embodiment of the present disclosure further provides a communications device (shown in FIG. 2). The communications device is configured to implement any one of the methods above.

When the communications device is a first communications device, such as the first network side device, the processor 10 is configured to configure, for a second communications device, a reception timing parameter corresponding to transmission, where the reception timing parameter includes at least two timing points respectively corresponding to at least two transmission points, and the at least two transmission points are configured to transmit downlink data to the terminal device cooperatively; and the transmitter 20 is configured to send indication information to the second communications device, where the indication information is used to indicate the reception timing parameter.

Optionally, the receiver 30 is configured to receive a capability parameter sent by the second communications device. The capability parameter is used to indicate that the second communications device supports a plurality of reception timings. The processor 10 is configured to configure, for the second communications device based on the capability parameter, the reception timing parameter corresponding to transmission.

Optionally, the transmitter 20 is configured to: send a plurality of groups of timing configuration identifiers and reception timing parameters by using higher layer signaling;

and send, by using physical layer signaling, indication information used to indicate a timing configuration identifier corresponding to transmission.

Optionally, the transmitter 20 is configured to send the indication information by using downlink control information DCI. The indication information is used to indicate the corresponding timing configuration identifier and one or any combination of a transmitted codeword, an antenna port, and a quantity of transmission layers of at least one of the at least two transmission points.

Optionally, the transmitter 20 is configured to send the indication information by using higher layer signaling or physical layer signaling.

Optionally, the indication information is used to indicate identifiers of the at least two transmission points and the corresponding reception timing parameter; or the indication information is used to indicate the corresponding reception timing parameter and one or any combination of a transmitted codeword, an antenna port, and a quantity of transmission layers of at least one of the at least two transmission points.

Optionally, the transmitter 20 is configured to send the identifiers of the at least two transmission points and the corresponding reception timing parameter by using higher layer signaling.

When the communications device is a second communications device, such as the terminal device, the receiver 30 is configured to receive indication information sent by a first communications device, where the indication information is used to indicate a reception timing parameter corresponding to transmission, the timing parameter includes at least two timing points respectively corresponding to at least two transmission points, and the at least two transmission points are configured to transmit downlink data to the terminal device cooperatively; and the processor 10 is configured to determine the reception timing parameter based on the indication information.

Optionally, the receiver 30 is further configured to respectively receive, at the at least two timing points, the downlink data transmitted by the at least two transmission points in the coordinated manner.

Optionally, the transmitter 20 is configured to send a capability parameter to the first communications device. The capability parameter is used to indicate that the second communications device supports a plurality of reception timings.

Optionally, the receiver 30 is configured to: receive, by using higher layer signaling, a plurality of groups of timing configuration identifiers and reception timing parameters that are sent by the first communications device; and receive, by using physical layer signaling, indication information that is sent by the first communications device and that is used to indicate a timing configuration identifier corresponding to transmission. The processor 10 is configured to: determine, based on the indication information, the timing configuration identifier corresponding to transmission; and determine, in the plurality of groups of timing configuration identifiers and reception timing parameters, a reception timing parameter corresponding to the timing configuration identifier corresponding to transmission.

Optionally, the processor 10 is configured to determine, according to a table that is agreed on in a protocol or preconfigured and that is of a correspondence between indication information and a timing configuration identifier, a timing configuration identifier corresponding to the indication information as the timing configuration identifier corresponding to transmission.

Optionally, the receiver 30 is configured to receive, by using physical layer signaling, the indication information sent by the first communications device; and the processor 10 is configured to determine, according to a table that is agreed on in a protocol or preconfigured and that is of a correspondence between indication information and a timing value, timing values corresponding to the indication information as the at least two timing points.

Optionally, the correspondence table further includes a correspondence between indication information and one or any combination of a transmitted codeword, an antenna port, and a quantity of transmission layers of at least one of the at least two transmission points.

Optionally, the receiver 30 is configured to receive identifiers of the at least two transmission points and the corresponding reception timing parameter by using higher layer signaling; and the processor 10 is configured to determine a corresponding timing value based on an identifier of a transmission point transmitting data.

Figure 4:
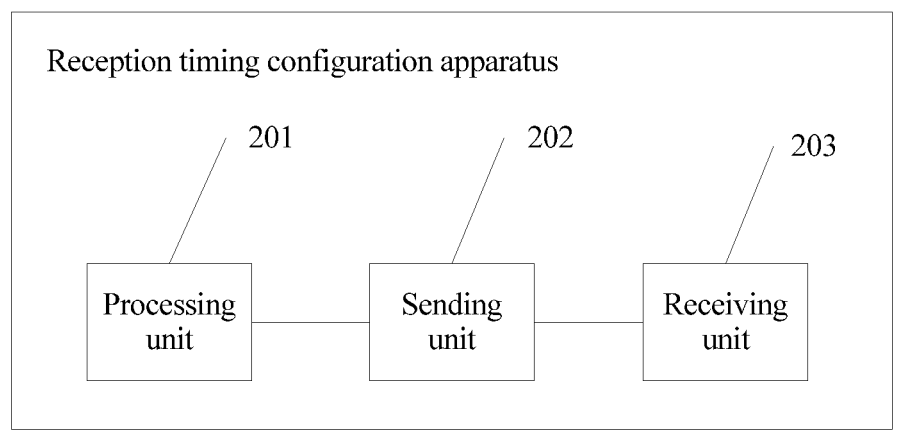
FIG. 4 is a functional block diagram of a communications device according to an embodiment of the present disclosure.

Based on a same disclosure idea, an embodiment of the present disclosure further provides a reception timing configuration apparatus. The apparatus includes a function module configured to perform the foregoing method blocks. In an optional way, as shown in FIG. 4, the apparatus includes a processing unit 201, a sending unit 202, and a receiving unit 203. During actual application, another unit or module may be further configured depending on an actual requirement.

Specifically, when the apparatus is configured to implement functions of a first communications device, the processing unit 201 is configured to configure, for a second communications device, a reception timing parameter corresponding to transmission, where the reception timing parameter includes at least two timing points respectively corresponding to at least two transmission points, and the at least two transmission points are configured to transmit downlink data to the terminal device cooperatively; and the sending unit 202 is configured to send indication information to the second communications device, where the indication information is used to indicate the reception timing parameter.

Optionally, the receiving unit 203 is configured to receive a capability parameter sent by the second communications device. The capability parameter is used to indicate that the second communications device supports a plurality of reception timings. Correspondingly, the processing unit 201 is configured to configure, for the second communications device based on the capability parameter, the reception timing parameter corresponding to transmission.

Optionally, the sending unit 202 is configured to: send a plurality of groups of timing configuration identifiers and reception timing parameters by using higher layer signaling; and send, by using physical layer signaling, indication information used to indicate a timing configuration identifier corresponding to transmission.

Optionally, the sending unit 202 is configured to send the indication information by using downlink control information DCI. The indication information is used to indicate the corresponding timing configuration identifier and one or any combination of a transmitted codeword, an antenna port, and a quantity of transmission layers of at least one of the at least two transmission points.

Optionally, the sending unit 202 is configured to send the indication information by using higher layer signaling or physical layer signaling.

Optionally, the sending unit 202 is configured to send identifiers of the at least two transmission points and the corresponding reception timing parameter by using higher layer signaling.

Specifically, when the apparatus is configured to implement functions of a second communications device, the receiving unit 203 is configured to receive indication information sent by a first communications device, where the indication information is used to indicate a reception timing parameter corresponding to transmission, the timing parameter includes at least two timing points respectively corresponding to at least two transmission points, and the at least two transmission points are configured to transmit downlink data to the terminal device cooperatively; and the processing unit 201 is configured to determine the reception timing parameter based on the indication information.

Optionally, the receiving unit 203 is further configured to respectively receive, at the at least two timing points, the downlink data transmitted by the at least two transmission points in the coordinated manner.

Optionally, the sending unit 202 is configured to send a capability parameter to the first communications device. The capability parameter is used to indicate that the second communications device supports a plurality of reception timings.

Optionally, the receiving unit 203 is configured to: receive, by using higher layer signaling, a plurality of groups of timing configuration identifiers and reception timing parameters that are sent by the first communications device; and receive, by using physical layer signaling, indication information that is sent by the first communications device and that is used to indicate a timing configuration identifier corresponding to transmission.

Correspondingly, the processing unit 201 is configured to: determine, based on the indication information, the timing configuration identifier corresponding to transmission; and determine, in the plurality of groups of timing configuration identifiers and reception timing parameters, a reception timing parameter corresponding to the timing configuration identifier corresponding to transmission.

Optionally, the processing unit 201 is configured to determine, according to a table that is agreed on in a protocol or preconfigured and that is of a correspondence between indication information and a timing configuration identifier, a timing configuration identifier corresponding to the indication information as the timing configuration identifier corresponding to transmission.

Optionally, the receiving unit 203 is configured to receive, by using physical layer signaling, the indication information sent by the first communications device. Correspondingly, the processing unit 201 is configured to determine, according to a table that is agreed on in a protocol or preconfigured and that is of a correspondence between indication information and a timing value, timing values corresponding to the indication information as the at least two timing points.

Optionally, the receiving unit 203 is configured to receive identifiers of the at least two transmission points and the corresponding reception timing parameter by using higher layer signaling.

Correspondingly, the processing unit 201 is configured to determine a corresponding timing value based on an identifier of a transmission point transmitting data.

Various variations and specific optional implementations in the reception timing configuration method in the foregoing embodiments are also applicable to the apparatus in this embodiment and the communications device in FIG. 2. From the foregoing detailed description of the reception timing configuration method, a person skilled in the art may clearly know an implementation method of the apparatus in this embodiment and the communications device in FIG. 2. Therefore, for brevity of the specification, details are not described herein again.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specified function in one or more processes in the flowcharts and/or in one or more blocks in the block diagrams.

These computer program instructions may also be stored in a computer readable memory that can instruct the computer or the another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may also be loaded onto a computer or another programmable data processing device, so that a series of operations and blocks are performed on the computer or the another programmable device, thereby generating computer-implemented processing. Therefore, the instructions executed on the computer or the another programmable device provide blocks for implementing a specified function in one or more processes in the flowcharts and/or in one or more blocks in the block diagrams.

Obviously, a person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

The invention claimed is:

1. An apparatus, being a first network side device or a chipset for the first network side device, wherein the first network side device is a serving network side device of a terminal device and configured to communicate with the terminal device via an air interface for coordinated multi-point (CoMP) transmission where two geographically separated transmission points are configured to transmit downlink data to the terminal device in a coordinated manner, and wherein said two geographically separated transmission points are said first network side device and a second network side device, wherein the apparatus comprises:

a receiver, configured to:
   receive a capability parameter from the terminal device, wherein the capability parameter indicates that the terminal device supports a plurality of reception timings, a processor, configured to:
   determine, for the terminal device, a reception timing parameter based on the capability parameter for the CoMP transmission from said two geographically separated transmission points to the terminal device, wherein the reception timing parameter comprises at least two timing points respectively corresponding to the two geographically separated transmission points;

a transmitter, configured to:
   send, using higher layer signaling, a plurality of groups of timing configuration identifiers and reception timing parameters corresponding to timing configuration identifiers; and
   send, using physical layer signaling, indication information to the terminal device, wherein the indication information indicates a timing configuration identifier corresponding to transmission;

wherein the at least two transmissions points are configured to transmit, at the at least two timing points, the downlink data to the terminal device in the coordinated manner.

2. The apparatus according to claim 1, wherein the transmitter is configured to: send the indication information using downlink control information (DCI), wherein the indication information indicates the corresponding timing configuration identifier and one or more of a transmitted codeword, an antenna port or a quantity of transmission layers of at least one of the at least two transmission points.

3. The apparatus according to claim 1, wherein the indication information indicates identifiers of the at least two transmission points and the corresponding reception timing parameter; or
   the indication information indicates the corresponding reception timing parameter and one or more of a transmitted codeword, an antenna port or a quantity of transmission layers of at least one of the at least two transmission points.

4. An apparatus, being a terminal device, or a chipset for the terminal device, wherein the terminal device is configured to communicate with a first network side device being a serving network side device of the terminal device via an air interface for coordinated multipoint (CoMP) reception where the terminal device is configured to receive downlink data from two geographically separated transmission points in a coordinated manner, and wherein said two geographically separated transmission points are the first network side device and a second network side device, and the apparatus comprises:

a transmitter, configured to:
   send a capability parameter to the first network side device, wherein the capability parameter indicates that the terminal device supports a plurality of reception timings;

a receiver, configured to:
   receive indication information from the first network side device, wherein the indication information indicates a reception timing parameter based on the capability parameter for a CoMP transmission from the two geographically separated transmission points to the terminal device, and the reception timing parameter comprises at least two timing points respectively corresponding to the two geographically separated transmission points;
   receive, using higher layer signaling, a plurality of groups of timing configuration identifiers and reception timing parameters respectively corresponding to timing configuration identifiers that are from the first network side device; and
   receive, using physical layer signaling, the indication information that is from the first network side device and that indicates a timing configuration identifier; and a processor, configured to:
   determine, based on the indication information, the timing configuration identifier corresponding to transmission; and
   determine, in the plurality of groups of timing configuration identifiers and reception timing parameters, a reception timing parameter corresponding to the timing configuration identifier wherein the receiver is further configured to respectively receive, at the at least two timing points, the downlink data from the at least two transmission points in the coordinated manner.

5. The apparatus according to claim 4, wherein the processor is configured to determine, according to a table that is agreed on in a protocol or preconfigured and that is of a correspondence between the indication information and the timing configuration identifier, the timing configuration identifier corresponding to the indication information as the timing configuration identifier corresponding to transmission.

6. The apparatus according to claim 4, wherein the
   the processor is configured to determine, according to a table that is agreed on in a protocol or preconfigured and that is of a correspondence between the indication information and a timing value, timing values corresponding to the indication information as the at least two timing points.

7. The apparatus according to claim 5, wherein the correspondence table further comprises a correspondence between the indication information and one or any combination of a transmitted codeword, an antenna port, or a quantity of transmission layers of at least one of the at least two transmission points.

8. The apparatus according to claim 4, wherein the receiver is configured to receive identifiers of the at least two transmission points and the corresponding reception timing parameter by using higher layer signaling; and
   the processor is configured to determine a corresponding timing value based on an identifier of a transmission point transmitting data.

9. A communications method, performed by a first network side device, or a chipset for the first network side device, for coordinated multipoint (CoMP) transmission where two geographically separated transmission points are configured to transmit downlink data to a terminal device in a coordinated manner, wherein the first network side device is a serving network side device of the terminal device and adapted to communicate with the terminal device via an air interface, and wherein said two geographically separated transmission points are said first network side device and a second network side device, wherein the method comprises:
receiving a capability parameter from the terminal device, wherein the capability parameter indicates that the terminal device supports a plurality of reception timings;
determining, for the terminal device, a reception timing parameter based on the capability parameter for the CoMP transmission from the two geographically separated transmission points to the terminal device, wherein the reception timing parameter comprises at least two timing points respectively corresponding to the two geographically separated transmission points;
sending, using higher layer signaling, a plurality of groups of timing configuration identifiers and reception timing parameters corresponding to timing configuration identifiers; and
sending, using physical layer signaling, indication information to the terminal device, wherein the indication information indicates a timing configuration identifier corresponding to transmission;
wherein the at least two transmissions points are configured to transmit, at the at least two timing points, the downlink data to the terminal device in the coordinated manner.

10. A communications method, performed by a terminal device, or a chipset for the terminal device, for coordinated multipoint (CoMP) reception where the terminal device is configured to receive downlink data from two geographically separated transmission points in a coordinated manner, wherein the terminal device is adapted to communicate with a first network side device being a serving network side device of the terminal device via an air interface, and wherein said two geographically separated transmission points are said first network side device and a second network side device, wherein the method comprises:

sending a capability parameter to the first network side device, wherein the capability parameter indicates that the terminal device supports a plurality of reception timings;
receiving indication information from the first network side device, wherein the indication information indicates a reception timing parameter for the terminal device from the first network side device based on the capability parameter for a CoMP transmission from said two geographically separated transmission points to the terminal device, the reception timing parameter comprises at least two timing points respectively corresponding to the two geographically separated transmission points;
receiving, using higher layer signaling, a plurality of groups of timing configuration identifiers and reception timing parameters respectively corresponding to timing configuration identifiers that are from the first network side device;
receiving, using physical layer signaling, the indication information that is from the first network side device and that indicates a timing configuration identifier;
determining, based on the indication information, the timing configuration identifier corresponding to transmission;
determining, in the plurality of groups of timing configuration identifiers and reception timing parameters, a reception timing parameter corresponding to the timing configuration identifier; and
respectively receiving, at the at least two timing points, the downlink data transmitted by the at least two transmission points in the coordinated manner.

* * * * *